United States Patent [19]

Wheeler et al.

[11] Patent Number: 4,915,559

[45] Date of Patent: Apr. 10, 1990

[54] LIGHTWEIGHT FASTENER

[75] Inventors: Roland A. Wheeler; Jack Rath, both of Los Angeles, Calif.

[73] Assignee: VSI Corporation, Culver City, Calif.

[21] Appl. No.: 56,456

[22] Filed: May 29, 1987

[51] Int. Cl.[4] .................... F16B 35/00; F16B 37/16; B21D 53/20; B21K 1/44
[52] U.S. Cl. .................... 411/366; 411/424; 411/436; 10/27 R; 10/86 R; 72/469
[58] Field of Search .................. 411/366, 411–416, 411/500, 424, 426, 427, 436, 399; 10/10 R, 27 R, 86 F, 86 R, 152 R, 153; 72/88–90, 469

[56] References Cited

U.S. PATENT DOCUMENTS

| | | | |
|---|---|---|---|
| 929,027 | 7/1909 | Schuhmann | 411/436 X |
| 1,764,053 | 6/1930 | Reed et al. | 10/10 R |
| 1,940,617 | 12/1933 | Temple | 411/427 X |
| 2,215,930 | 9/1940 | Mahla | 411/411 X |
| 2,314,390 | 3/1943 | DeVellier | 10/10 R |
| 2,340,706 | 2/1944 | Somes | 411/411 X |
| 2,740,136 | 4/1956 | Chiaberta et al. | 10/10 R |
| 2,793,884 | 5/1957 | Jungblut | 411/411 X |
| 2,895,367 | 7/1959 | Nagy | 411/378 |
| 2,985,898 | 5/1961 | Goude | 10/27 R |
| 3,538,739 | 11/1970 | Orlomoski | 72/469 |
| 3,828,422 | 8/1974 | Schmitt | 411/366 |
| 4,034,586 | 7/1977 | Corrette | 72/469 |
| 4,157,725 | 6/1979 | Stanaitis | 411/147 |
| 4,254,809 | 3/1981 | Schuster | 411/500 |
| 4,260,005 | 4/1981 | Stencel | 411/416 |
| 4,326,825 | 4/1982 | Volkmann et al. | 411/424 |

FOREIGN PATENT DOCUMENTS

| | | | |
|---|---|---|---|
| 204236 | 7/1959 | Austria | 411/411 |
| 843952 | 7/1952 | Fed. Rep. of Germany | 411/411 |
| 54-106754 | 8/1979 | Japan . | |
| 188372 | 8/1937 | Switzerland | 411/411 |
| 685703 | 1/1953 | United Kingdom . | |
| 2074280 | 10/1981 | United Kingdom | 411/436 |
| 2088508 | 6/1982 | United Kingdom | 411/366 |

Primary Examiner—Neill R. Wilson
Attorney, Agent, or Firm—Christie, Parker & Hale

[57] ABSTRACT

An aerospace fastener comprises a bolt with a roll-formed thread, and a nut with a similar thread having a uniform pitch P. The bolt has a cylindrical shank, a threaded tip and a run-out zone between the shank and tip. The thread root in the run-out follows a concave curve having a radius in the range of from 2.0P to 2.7P and extends 1.58P to 1.8P from the maximum grip plane of the bolt. The nut has a convexly curved run-in truncating the crest of the nut thread complementary to the run-out to clear the root of the bolt thread when the nut is assembled on the bolt in the minimum grip condition. This permits the nut to be assembled on the bolt further than in a conventional combination, and shortening of the nut and bolt by at least 1P to save weight.

51 Claims, 4 Drawing Sheets

LIGHTWEIGHT FASTENER

CROSS-REFERENCE TO RELATED APPLICATION

This application is related to our U.S. patent application Ser. No. 846,940, filed Apr. 1, 1986, now U.S. Pat. No. 4,842,466. The subject matter of the prior application is hereby incorporated by reference.

BACKGROUND OF THE INVENTION

This invention concerns lightweight fasteners such as for aerospace applications. A bolt with roll formed threads and better than usual effective thread run-out is provided. A shortened nut with a truncated thread for clearance from the bolt thread run-out is also provided. Because of such improvements the nut and bolt can each be one pitch length shorter than a conventional nut and bolt.

Weight of the fasteners is of great concern in airplanes and other aerospace applications. The nuts, bolts, rivets and the like employed for securing the structural elements of an airplane contribute a substantial portion to the total weight of the airplane since very large numbers of such fasteners are used. It is not unusual to use over 100,000 fasteners on one airplane. Thus, there has been a long effort to reduce the weight of fasteners without decreasing the strength, or preferably decreasing weight while increasing strength. Even an apparently small decrease in weight on an individual fastener can have a large impact on the total weight of an airplane.

Nuts and bolts are ubiquitous fasteners on aircraft. The vast majority of aircraft bolts have roll formed threads because of the superior fatigue properties of these threads as compared with machined threads. To make such bolts, a machined metal blank is rolled between a pair of thread forming dies for placing a thread on the blank. Metal is not removed from the blank in this process, but instead the metal is deformed as the thread forming die presses in to form the root of the thread. The displaced metal flows outwardly to form the crest of the thread. A conventional thread rolling die has uniform thread forming ridges and grooves over most of its width for making a uniform thread. The edges of the dies are, however, chamfered or rounded somewhat to avoid damage to the die. This chamfer results in a short run-out zone between the cylindrical shank of the bolt and the end on which threads are fully formed.

In conventional threaded aircraft fasteners the run-out zone has a length of up to two times the pitch of the thread. Within the run-out zone the root of the thread is not fully developed because of the chamfer on the roll forming die. That is, the thread is shallower than in the portion of the bolt where the thread is fully developed. Concomitantly, the crest of the thread in the run-out is not fully developed since less metal is displaced from the root. Thus, in the run-out the outside diameter of the crest of the thread is less than the major diameter in the fully threaded portion. The flanks of the bolt thread, which carry the tensile load on the nut and bolt combination, may or may not be fully developed in the run-out. Thus, in the run-out the thread is referred to as imperfect and nonfunctional. The maximum length of the run-out under the specifications used in the aerospace industry is 2P, where P is the pitch of the thread. The actual length of the run-out due to normal manufacturing variations is in the range of from 1.5P to 2P.

Nuts used with conventional aerospace fasteners typically have a counterbore collar concentric with the threaded hole through the nut. The length of the counterbore is such that when fully tightened, the threaded portion of the nut does not extend into the run-out on the bolt. If it were to extend into the run-out there would be thread interference between the crest of the nut thread and the incompletely formed bolt thread root, and the nut could not be properly tightened on the parts being secured.

The length of the cylindrical shank of a bolt from its head to the beginning of the thread run-out is referred to as the "maximum grip." If the fastener has a flush head, the grip is from the top of the head to the end of the shank. With a raised head not countersunk into one of the parts being secured, the grip is the cylindrical, unthreaded length of the shank. The plane corresponding to the maximum thickness of parts to be held by a bolt is sometimes also referred to as the "maximum grip." High strength aerospace fasteners are designed so that the maximum grip corresponds to the maximum thickness of the parts being secured together. The minimum grip is typically one-sixteenth inch (1.6 mm) less than the maximum grip. For example, an aircraft fastener may have a nominal length of one quarter inch (6.35 mm) for the maximum grip. The fastener would be used for securing together parts having a total thickness in the range of from three-sixteenths inch (4.76 mm) to one-quarter inch (6.35 mm).

The depth of the nut counterbore in a conventional aerospace fastener is the difference between the maximum grip and minimum grip plus about 1.5P. A small amount may be added to account for accumulated manufacturing tolerances. This means when the nut is secured against parts having the minimum grip, the ends of the threads in the nut are at the end of the run-out, a distance of about 1.5P from the end of the cylindrical shank of the bolt. When the nut is secured against parts having the maximum grip, the threads on the nut stops about one-sixteenth inch (1.6 mm) plus 1.5P from the end of the run-out. The same concept is present in metric bolts, and the difference between minimum grip and maximum grip is typically one millimeter or two millimeters. Thus, the depth of a nut counterbore is 1 mm or 2 mm plus 1.5P.

It has been recognized that if the thread run-out were reduced to 1P or less instead of about 2P, the length of the counterbore on the nut should be reduced, thereby reducing the total length of the nut. This also permits a shortening of the bolt thread and overall length by 1P. The weight savings in an airplane by reducing the length of both collar of the nut and bolt by as little as 1P can be quite substantial.

Aerospace bolts have been developed with an effective run-out of only about 1P. In one such design, for example, a special roll forming die is used. Instead of tapering the root of the thread and producing an imperfect thread, a full thread is carried to within 1P of the cylindrical shank. This has permitted reduction of the total length of the nut and bolt by 1P without significantly reducing the tensile strength of the nut and bolt combination.

This type of short run-out bolt has drastically reduced fatigue properties as compared with a conventional bolt having a run-out length of up to 2P. An exemplary tensile fatigue test simulates an application where the parts secured together do not have parallel faces. For example, two parts may be secured together with the face engaged by the nut being out of perpendicular with the axis of the bolt shank by three degrees.

In a three degree tensile fatigue test there is comparable off-axis loading which induces some bending in the bolt. In an exemplary fatigue test an assembly of a nut and bolt is cycled between an upper tensile load of 50% of the rated capacity of the combination and a minimum load of 5% of the rated load bearing capacity of the combination. The number of cycles to failure is measured.

In such a test the bolt with a modified thread having only an effective 1P run-out has only about 20% of the fatigue life of a conventional bolt with up to 2P run-out. For example, if a conventional bolt has fatigue life of 100,000 cycles, the modified lightweight bolt may have a fatigue life as low as 20,000 cycles in the three degree off-axis fatigue test. The adverse impact on tensile fatigue is apparently due to having a rather deep thread close to the maximum grip plane at the end of the cylindrical shank. Such a short run-out bolt is also substantially poorer in a lap shear test than a bolt with a run-out of 2P.

Thus, there are two types of shortcomings in existing aerospace fasteners. In one type of fastener there is adequate tensile strength and tensile fatigue strength, but the fastener is relatively long and therefore relatively heavy. On the other hand, a fastener has been produced which is shorter and hence lighter, but the tensile fatigue properties of that fastener are significantly adversely affected.

Thus, it is desirable to provide an aerospace fastener with roll formed threads where the length of the nut and bolt can be reduced without reducing either the tension capability of the combination or the off-axis tensile fatigue strength of the combination. It is desirable to make such a fastener using roll forming dies relatively unchanged from conventional roll forming dies. It is particularly desirable to provide such a combination of a nut and bolt that has increased strength as compared with conventional aerospace fasteners.

BRIEF SUMMARY OF THE INVENTION

Thus, there is provided in practice of this invention according to a presently preferred embodiment, a threaded bolt having a cylindrical shank and a tip with a roll formed thread. Between the shank and the fully developed thread on the tip there is a run-out zone having a length in the range of from 1.58P to 1.8P from the maximum grip plane of the bolt, where P is the pitch of the thread. In the run-out zone the root of the thread tapers continuously along a concave curve from the minimum root diameter at a distance of from about 1.58P to 1.8P from the shank to approximately the diameter of the shank at its end. The radius of curvature of the run-out is in the range of from 2.0P to 2.7P.

A nut has a hole with a thread and a counterbore at one end. A run-in truncating the crest of the thread extends into the thread from the counterbore with a larger diameter at the end of the counterbore and a smaller diameter at a distance of at least 1.8P from the maximum grip plane of a bolt with which the nut is used. The concavely curved run-in is approximately parallel to the run-out of the root of the bolt thread, and preferably has a radius in the range of from 1.7 to 2.7P. When such a nut and bolt are assembled, the run-in the nut provides clearance between the truncated crest of the nut thread and the root of the bolt thread. This permits the nut to be threaded onto the bolt with a partial thread in the nut engaging a partial thread on the bolt when gripping parts of minimum dimensions. The engagement of the partial threads enhances the strength of the combination with out increasing overall length.

BRIEF DESCRIPTION OF THE DRAWINGS

These and other features and advantages of the present invention will be appreciated as the same becomes better understood by reference to the following detailed description when considered in connection with the accompanying drawing wherein.

DETAILED DESCRIPTION

Figure 1:
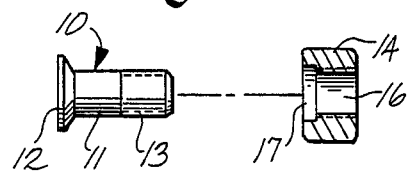
FIG. 1 illustrates in side view and cross-section exemplary bolt and nut, respectively, of a type employed in practice of this invention.

An exemplary aerospace bolt 10 has a cylindrical shank 11, a head 12, and a threaded tip 13. In the jargon of the fastener art, the bolt may be referred to as a pin, the shank may be referred to as the grip, and the tip may simply be referred to as the thread. In the illustration of FIG. 1 a flush head bolt is shown. It will be understood, however, that a broad variety of bolt heads are employed in the fastener industry and the specific head is of no concern in practice of this invention. It will also be recognized that the bolt need not be torqued from the head but may have means at the end of the tip or dog for receiving or resisting torque. For example, a breakaway portion may be attached to the tip when a blind fastener is employed. Such features of the bolt are not material since this invention concerns the thread.

An exemplary nut 14 has a threaded hole 16 and a counterbore 17 at one end of the thread to form a collar 15 which fits over the bolt shank when parts have less than maximum grip. The external form of the nut is not material to practice of this invention.

Figure 2:
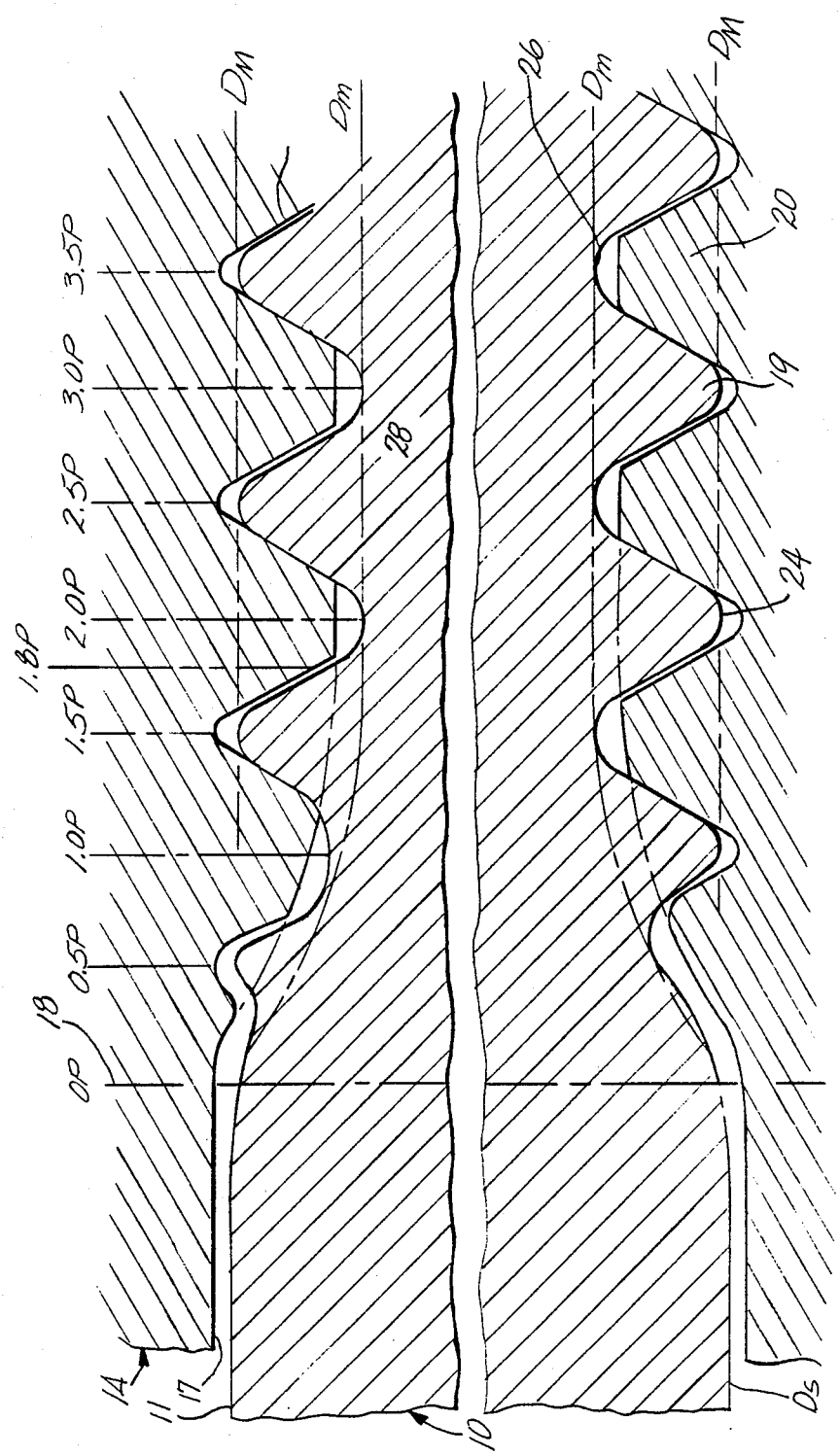
FIG. 2 illustrates in fragmentary cross-section the run-out zone of the thread on a bolt and the run-in zone of a nut thread as provided in practice of this invention.

As illustrated in FIG. 2 a typical fastener made under thread specification MIL-S-8879 has a 60° thread form; that is, the flanks of the thread are at an included angle of 60°. The pitch P of the thread is the distance from the flank of the thread at the pitch diameter to the corresponding location at the next turn of the thread. In other words, the pitch is 1/n where n is the number of threads per inch. The principles of this invention are applicable to other thread forms.

The end of the cylindrical shank 11 is at a plane 18 corresponding to the maximum grip of the bolt. This plane itself is commonly referred to as the maximum grip of the bolt. At a distance greater than 1.8P from the end of the shank or maximum grip plane 18, the bolt thread 19 is fully developed by roll forming to conform to the applicable standard, such as MIL-S-8879.

Except at the end described hereinafter, the thread 20 on the nut engages the bolt thread 19 in a conventional manner. In the maximum material condition for both nut and bolt there may be a very tight fit on both flanks of the threads. The maximum material condition is the condition when the bolt has its largest volume and hence is at the maximum dimensions permitted for the particular bolt specification. Concomitantly, the nut has its maximum volume and the size of the threaded hole is at a minimum. This is the tightest fit of the nut and bolt. As illustrated in FIG. 2, the flanks of the threads on the side of the bolt thread nearer the shank are in tight engagement and a small clearance 21 may be present between the flanks of the nut and bolt shank. This would be a typical condition when the nut is tightened on the bolt.

The minimum material condition is analogous. In that condition the bolt is at its smallest diameter and the nut has its largest inside diameter within the ranges permitted by the applicable specified tolerances. Obviously either or both of the nut or bolt can be at sizes between the maximum material and minimum material conditions. Fasteners are designed to allow for both extremes, maximum material and minimum material, of the tolerance ranges.

A bolt thread run-out zone 22 extends a distance in the range of from 1.58P to 1.8P from the maximum grip plane 18. It is preferred that the run-out be near the upper end of the range, for example, about 1.75P. Preferably the run-out zone has a minimum length of 1.58P to avoid degrading fatigue properties of the bolt. The run-out zone has a preferred maximum length of 1.8P so that the total length of the nut and bolt assembly can be shortened as compared with standard aerospace fasteners.

The diameter of the bolt shank is $D_s$. The major diameter, $D_M$, is the diameter of the crest 24 of the bolt thread. The minor diameter, $D_m$, is the diameter at the root 26 of the bolt thread. In aerospace fasteners the major diameter $D_M$ is less than the shank diameter $D_s$.

Figure 3:
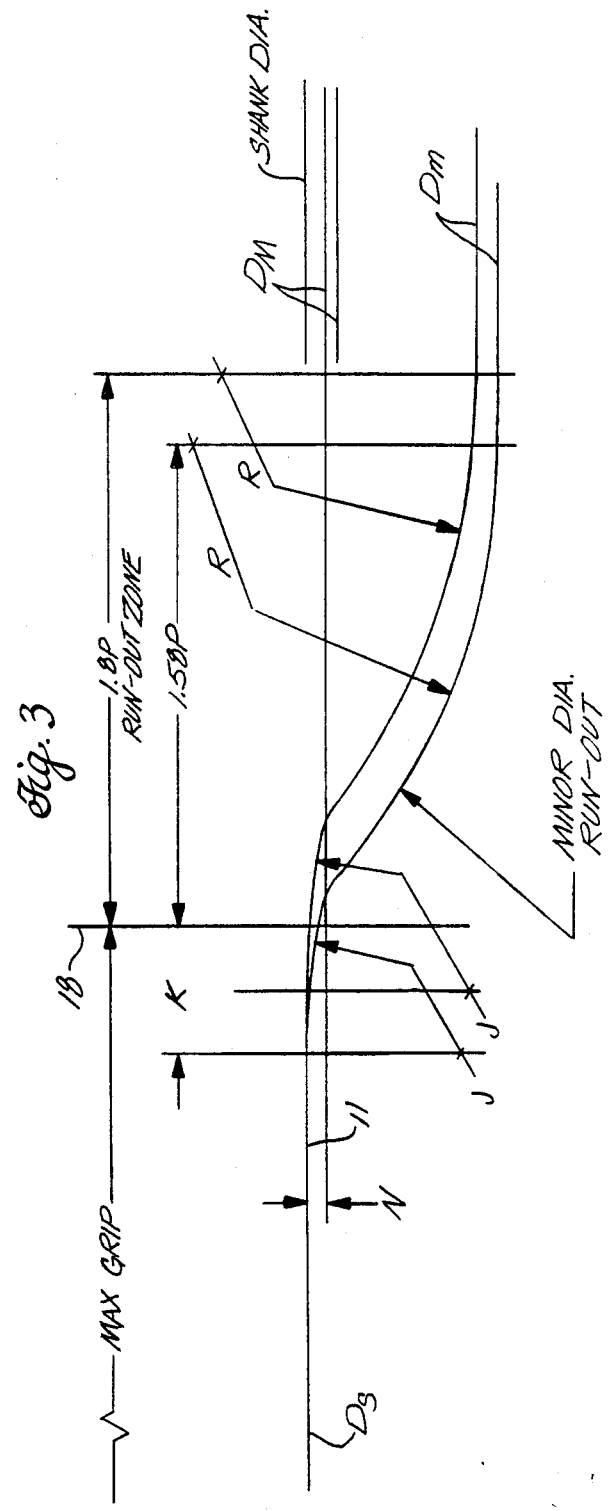
FIG. 3 illustrates schematically the geometry of the run-out of such a bolt.
Figure 4:
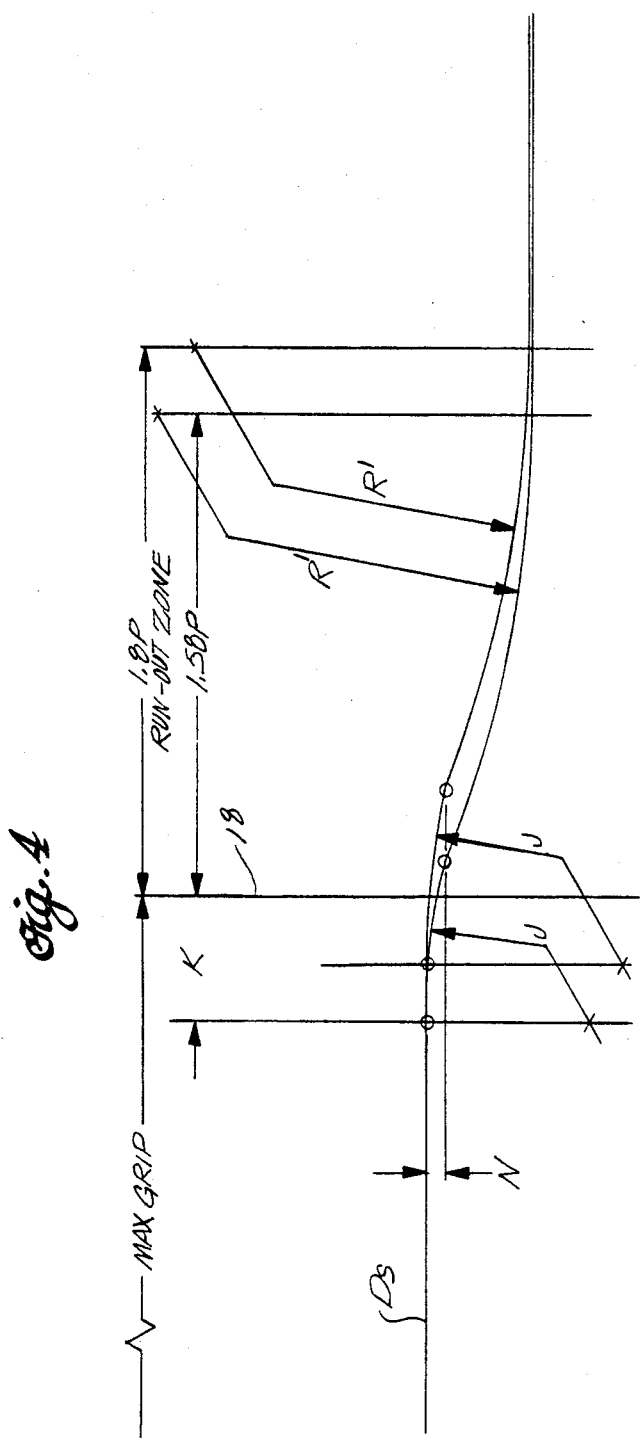
FIG. 4 illustrates schematically the geometry of the blank from which such a bolt is roll formed.

The shape of the root of the thread in the run-out zone is indicated in FIG. 3. In this drawing an envelope for the run-out zone is indicated to accommodate a range of tolerances or differences between maximum material and minimum material conditions. The shank diameter $D_s$ is indicated as a single line as is the maximum grip plane 18. The maximum grip plane does not have a discernable mark on the bolt, but as pointed out hereinabove, is a specified distance from the bolt head.

The minor diameter $D_m$ is illustrated as two straight lines at a distance greater than 1.8P from the maximum grip plane. In this drawing the lower line is nearer the axis of the bolt and represents the minimum diameter the root of the thread may have within the tolerance ranges specified, i.e., the minimum material condition for the bolt. The upper line represents the minor diameter in the maximum material condition. In an exemplary embodiment, the difference between the minimum and maximum acceptable minor diameters is about 0.005 inch (130 microns). Two lines $D_M$ are also illustrated for the major diameter of the thread form on the bolt. The range of tolerances for the major diameter is about one-half that of the minor diameter. Only the major diameter for the maximum material condition is referred to hereinafter. In an exemplary embodiment, the difference between the shank diameter $D_s$ and the major diameter $D_M$ is about 0.004 inch (100 microns). Thus the distance N between the radii illustrated in FIG. 3 is 0.002 inch (50 microns).

Between the fully developed thread on the tip and the maximum grip plane there is a run-out zone having a length in the range of from 1.58P to 1.8P from the maximum grip plane to the fully developed thread on the tip. The length of the run-out zone is at least 1.58P when the minor diameter is in the minimum material condition. The length of the run-out zone is up to 1.8P when the minor diameter is in the maximum material condition.

Within the run-out zone the minor diameter run-out follows a "concave" curve having a radius R (indicated by an angled line in FIG. 3) rather than extending as a straight line to the center of curvature and requiring an enlargement of FIG. 3. The radius is centered approximately opposite the end of the run-out zone so that the concave curve of the thread root is tangent to the minor diameter at the end of the run-out zone. Thus, in FIG. 3 two different radial lines are illustrated. As used herein the term "concave curve" is used to refer to a curved contour which in longitudinal cross section is concave toward the direction away from the material of which the fastener is made. Conversely, an outwardly convex curve refers to a curvature that is convex away from the material of the fastener when seen in longitudinal cross section.

In a preferred embodiment, a slight convex "lead-in" is provided on the end of the cylindrical shank adjacent to the maximum grip plane. The curvature of the lead-in is illustrated in FIG. 3 by a radius J. When the bolt is in the minimum material condition the radius J is centered at a maximum distance K from the maximum grip plane 18. This assures that the lead-in radius is tangent to the shank diameter at a maximum distance K from the maximum grip plane. When the bolt is in the maximum material condition the radius J may be centered nearer the maximum grip plane than the maximum distance K. The length of the lead-in between the maximum grip plane and the bolt head is in the order of 0.5P.

The purpose of the lead-in is to aid insertion of the bolt in the parts being assembled. A tight fit is typically specified for aerospace bolts, and under those circumstances, a lead-in is important for insertion of the bolt without damage to the parts.

It will be noted from FIG. 3 that the intersection of the concave curve defining the root of the thread in the run-out zone intersects the convex lead-in a short distance beyond the maximum grip plane of the bolt. This intersection is substantially at the major diameter of the bolt thread.

The dimensions of the run-out zone and associated structure depend on the nominal bolt size and pitch (because of its effect on thread depth). Thus, for larger bolts the radius of curvature R of the concave run-out tends to be larger than for smaller bolts. The following table sets forth representative dimensions for three different nominal shank diameter bolts having pitches standard in the United States. The concave radius in each example lies in the range of from 2.0P to 2.7P. All of the dimensions given in the table are in inches. The dimensions are nominal and manufacturing tolerances provide a range for such dimensions corresponding to maximum material and minimum material conditions.

| Nominal Diameter | Pitch | Run-Out Radius R | Blank Radius R' | Lead-in Radius J | Lead-in Length K(max) | $D_s$-$D_M$ N(min) |
|---|---|---|---|---|---|---|
| 5/32 | .03125 | .070 | .122 | .075 | .013 | .0020 |

-continued

| Nominal Diameter | Pitch | Run-Out Radius R | Blank Radius R' | Lead-in Radius J | Lead-in Length K(max) | $D_S-D_M$ N(min) |
|---|---|---|---|---|---|---|
| 3/16 | .03125 | .066 | .119 | .092 | .016 | .00275 |
| ¼ | .03571 | .089 | .166 | .135 | .025 | .00275 |

Figure 6:
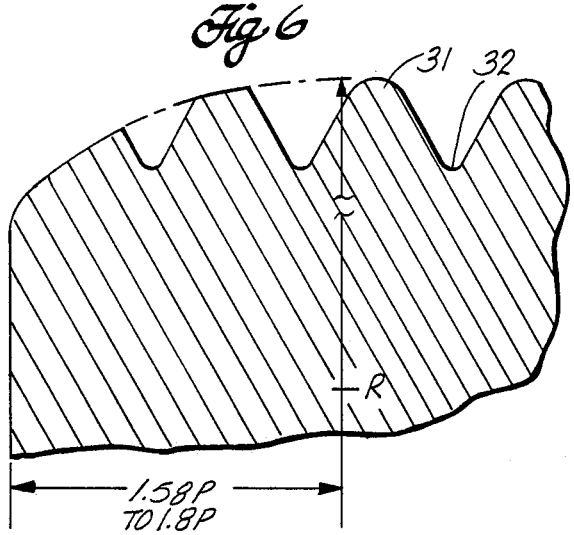
FIG. 6 is a fragmentary cross section of the edge of a roll forming die used to form a bolt as provided in practice of this invention.

The concave curve of the minor diameter in the run-out zone is formed by controlling the "chamfer" ground on the edge of the roll forming die used to form the thread on the bolt. FIG. 6 illustrates in fragmentary cross section the edge of such a roll-forming die. A conventional roll-forming die has a plurality of parallel ridges 31 and grooves 32 on one face with the ridges and grooves having a cross section complementary to the threads to be rolled. The ridges and grooves are skewed relative to the edge of the die by an amount appropriate for rolling a continuous thread on the tip of a bolt of a selected diameter. To form a bolt, a machined blank is rolled between a pair of such dies. The edge of the die is ground to be complementary to the concave curve hereinabove described and illustrated in FIG. 3. Thus the radius of curvature R on the edge of the roll forming die is in the range of from 2.0P to 2.7P.

Previously it has been the practice to simply grind a conical transition on a bolt between the cylindrical shank and approximately the pitch diameter of the tip. The blank from which a bolt made in practice of this invention is roll formed is ground with a concave curve with a radius R' in the run-out zone from near the maximum grip plane 18 to a distance in the range of from 1.58P to 1.8P from the maximum grip. The tip of the bolt blank is ground to substantially the pitch diameter of the thread to be formed. The concave curve in the run-out zone is tangent to the pitch diameter at a distance in the range of from 1.58P to 1.8P from the maximum grip plane 18. The concave curve intersects the lead-in at the same range of locations as the curve defining the intersection of the concave minor diameter run-out and the lead-in after the bolt has been roll formed.

Since the grind of the run-out zone on the bolt blank is at a larger diameter than the corresponding portion of the roll-forming die, a partial thread is rolled in the run-out zone. At least that portion of the thread inwardly (toward the bolt axis) from the grind radius R' is complete. An additional portion of the thread outside from the grind radius R' has complete flanks which are thereby available to carry tensile load between the nut and bolt. The minimum amount this thread in the run-out zone contributes to the strength of the nut and bolt combination has not yet been determined, however, tensile strengths above those projected based on no contribution from the thread in the run-out zone have been measured. Excellent off-axis tensile fatigue strength is also obtained which is believed to be due to the continuous concave curved radius formed at the thread root in the minor diameter run-out.

Figure 5:
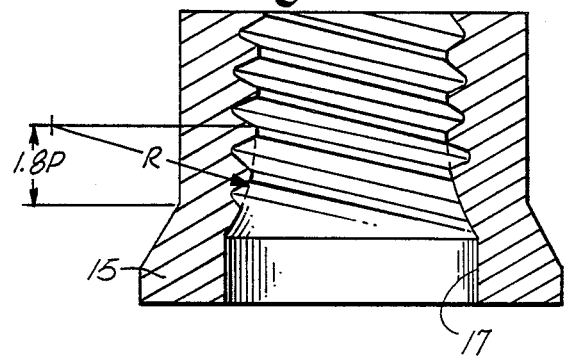
FIG. 5 illustrates such a nut in longitudinal cross-section.

The nut, as seen in FIGS. 2 and 5, has a thread 16 with the uniform pitch P to mate with the thread on the bolt. In the usual embodiment there is a cylindrical counterbore 17 for clearing the shank of the bolt. The nut is threaded for the full length between the counterbore and the opposite end of the hole.

Extending from the counterbore into the thread is a "run-in" truncating the crest of the thread. The run-in has a larger diameter at the end of the counterbore, and a smaller diameter approximately the same as the diameter of the crest 28 of the nut thread at a distance of at least 1.8P from the counterbore.

A bolt as provided in practice of this invention has at least a portion of the flanks of the thread in the run-out which is fully developed. In conventional roll forming of threads, there is an insufficient volume of metal in the blank to fill the thread groove in the die with displaced metal, resulting in an incomplete thread in the run-out. Since it has been anticipated that the thread may be incomplete, any contribution a partially complete thread might provide toward enhancing the strength of the nut and bolt combination has previously been deliberately sacrificed by extending the counterbore into the nut so as to always be beyond the run-out. Further, the maker of the roll forming die has devoted little attention to the precision of the chamfer at the edge of the die since it has little effect on the final product.

It is desirable, as mentioned above, to reduce the length of the collar, i.e., the depth of the counterbore in a nut so that the total length of the nut can be reduced with a concomitant reduction in the length of the bolt. Conventional aerospace nuts have had a counterbore depth of 1/16 inch (1.6 mm) plus 1.5P so that the run-out zone on a conventional bolt is completely cleared by the nut when the nut is tightened in the minimum grip condition. In that condition, the counterbore extends 1.5P beyond the maximum grip plane. There is no contribution to tensile strength from any thread formed in the run-out zone.

In practice of this invention, the depth of the counterbore is preferably 1/16 inch (1.6 mm, i.e., the difference between the maximum grip and minimum grip) plus no more than 0.5P. Preferably the depth of the counterbore is only 1/16 inch (1.6 mm) plus a small manufacturing tolerance, such as 0.005 inch (0.13 mm). In such an embodiment the end of the thread in the nut when screwed onto the bolt in the minimum grip condition is substantially at the maximum grip plane. A run-in truncating the crest of the nut thread is therefore provided to clear the run-out of the bolt thread root and avoid interference when the nut is threaded onto the bolt with the run-in overlapping the run-out. In such an embodiment, the nut can be at least 1P shorter than a conventional nut and the bolt also can be 1P shorter without any decrease in strength.

It is an important feature of this invention that when a nut is threaded onto a bolt with the run-in overlapping the run-out, the truncated incomplete thread in the run-in engages a completely formed portion of the thread in the run-out on the bolt. At the same time the truncation of the nut thread clears the incomplete thread root in the run-out. For this to occur the incomplete thread in the run-out is at least partly completely formed at diameters greater than the thread root in the run-out. In other words, when the thread in the run-out is roll formed there is sufficient metal deformed by the dies to partly fill the grooves in the dies, and at least a portion of the flanks of the thread are completely formed so as to engage the incomplete thread in the nut run-in.

Thus, when a nut is tightened against minimum grip parts there is a contribution to the tensile strength of the nut and bolt assembly by the engagement of the incomplete nut threads in the run-in with the incomplete threads on the bolt in the run-out. When the nut is in a position other than minimum grip, the incomplete thread in the nut engages complete thread on the bolt and there is a contribution to the tensile strength of the assembly. Because there is a contribution from the incomplete thread in the run-in, the length of the complete thread in the nut can be reduced as compared with a conventional nut having the same ability to carry a tension load. Since the portion of the nut with a complete thread is shorter, the portion of the bolt with a complete thread can also be shorter. The tension carrying ability of the bolt is maintained since the bolt thread carries the same load as the nut thread regardless of whether the nut is in the maximum grip position with incomplete run-in thread engaging complete bolt thread, or in the minimum grip position where the incomplete thread in the nut engages incomplete thread in the bolt run-out.

The comparison with conventional fasteners can also be slated somewhat differently. In a conventional fastener the nut has a specified length of complete thread for carrying a certain tension load and a relatively deep counterbore for clearing the required run-out of the bolt thread. In a fastener as provided in practice of this invention the total threaded length of the nut may be increased. A portion of this thread is incomplete because the thread crests are truncated. Since this incomplete thread carries some of the load, the length of the complete thread can be reduced. Because the incomplete thread in the run-in can clear the root of the incomplete thread on the bolt, the nut can be threaded onto the bolt a greater distance. Because of this, the depth of the counterbore can be shortened since there is no need to provide clearance from the bolt run-out. In effect "useless" counterbore which carries no tension load is traded for useful incomplete thread which does carry tension load. The result of this trade-off is a reduction of the total nut length.

When a nut is threaded on a bolt for assembling maximum grip parts, the end of the nut remote from the parts should coincide with the end of the bolt for minimum weight; any part of the bolt that extends beyond the nut carries no load and is just added weight. Since a nut as provided in practice of this invention has a shorter overall length, the bolt can be concomitantly shorter. Because of the contribution of the incomplete threads the total tension carrying capability of the assembly is not diminished. Since the run-out is kept long there is no abrupt change in cross-section of the bolt and tensile fatigue properties are maintained. Thus, the fastener has combined the previously inconsistent properties of light weight and high strength.

It is preferred in practice of this invention that the length of the run-out be in the range of from 1.58P to 1.8P. It will be recognized, however, that a somewhat longer run-out of the bolt thread root may be employed when the dies and blank are carefully dimensioned to maintain a substantially complete thread in a principal portion of the run-out. A concomitant increase in the length of the run-in can provide clearance between the nut and bolt threads while maintaining engagement of a principal portion of the incomplete threads. Although the weight savings may not be as great as with a shorter incomplete thread, a controlled run-out can be provided up to 2.3P on the bolt with a run-in of at least 2.3P the nut. The radius of curvature of the run-out is concomitantly increased.

For maximum ability to engage flanks on the thread in the run-out, it is preferred that the truncation of the crest of the thread in the nut have a convex curve complementary to the concave curve of the minor diameter run-out. Thus, the run-in follows a convex curve having a radius in the range of from 2.0P to 2.7P. Thus, as illustrated in FIG. 2, when the nut is on the bolt in the minimum grip condition, a portion of the nut thread in the run-in can engage the flank of the thread in the bolt run-out.

In practice some bolts are made "oversize". Such bolts are made with a larger than standard shank to substitute for a standard bolt when a hole in parts to be joined is slightly oversize due to repair work. It may occur, for example, that a hole is damaged so that a standard bolt no longer fits properly. Such a hole is then reamed 1/64 inch and a larger bolt is used. Thus, it is standard practice to provide "first oversize" and "second oversize" bolts which are 1/64 and 1/32 inch larger than a standard size bolt.

The oversize bolts typically have an oversize shank, with the original thread size on the tip. This requires a somewhat shorter radius run-out than a standard bolt while maintaining the length of the run-out in the range of from 1.58P to 1.8P. The nut employed on an oversize bolt has a larger diameter counterbore than a nut for a standard size bolt to clear the larger diameter shank. It is sometimes desirable to employ the first oversize nuts on both standard and first oversize bolts so that a separate stock of nuts does not need to be maintained in inventory. In such an embodiment the radius of curvature of the run-in in the nut is somewhat smaller to assure clearance of the thread root run-out in a first oversize bolt. For this reason the radius of the convexly curved run-in in the nut may be reduced to 1.7P.

The partial engagement of the nut thread with the bolt thread, regardless of whether in the minimum grip or other position, is also believed to contribute to the fatigue strength of the improved fastener.

In a fastener without a run-in, as provided in practice of this invention, a high proportion of the tensile load is carried by the first two or three turns of the thread. It is known, for example, that the first turn of a thread in a five turn nut may carry as much as 40% of the load, with the balance being distributed in a gradually decreasing amount with increasing distance from the end of the nut. This results in a high stress in the bolt adjacent to the beginning of the thread in the nut.

By having only partial engagement between the truncated thread in the nut and the thread on the bolt, the tensile load is distributed more uniformly along the thread in the nut and hence the maximum stress imposed on the bolt is reduced. This effect occurs whether the nut is in the minimum grip or maximum grip condition or at some location therebetween. This lowered stress level is believed to contribute to the increased fatigue strength of the fastener.

It is a common practice to make nuts with a weaker material than bolts so that ultimate failure in tension occurs by shearing off the nut thread rather than breaking the bolt. A truncated thread adjacent to the end of the nut may result in deformation of the first part of the thread and distribution of the load more uniformly with distance from the end of the nut. This could lower the maximum stress on the thread and delay the onset of shear failure. Regardless of the reason, it has been observed that a nut as provided in practice of this invention not only does not show any decrease in tensile load carrying capacity, but may actually show a small increase in strength in some embodiments.

In summary, in the run-out on the bolt the root of the thread decreases continuously along a concave curve from the shank diameter at the maximum grip plane to a location tangent to the minor diameter of the thread root at a distance from about 1.58P to about 1.8P from the maximum grip plane. The radius of the concave curve is preferably in the range of from 2.0P to 2.7P.

A nut with convexly curved run-in as provided in practice of this invention provides some engagement of the truncated nut thread with the thread on the bolt in the run-out when the assembly is tightened on minimum grip parts, thereby adding to the tensile strength of the assembly. The truncated thread maintains partial engagement with the thread on the tip of the bolt when tightened on thicker than minimum grip parts. The truncation of the nut thread prevents interference with the root of the bolt thread in the run-out. Preferably the radius of the curved run-in is in the range of from 1.7P to 2.7P.

When the thread in the run-out is made largely complete except for a gradual decrease in depth of the root and the nut has a truncated thread run-in to clear the thread run-out there can be engagement of the matching incomplete threads, and the total run-out length may be up to 2.3P while still maintaining good tensile strength and reasonably light weight in the assembly.

It has been found in practice of this invention in a specific example, that a length reduction of at least 1P can be provided in both the nut and bolt, with consequent weight reduction. A 10–32 UNJF fastener is a nominal 3/16 inch fastener which has a pitch of 0.03125 inch. A convex run-in is provided in such a nut for a distance of at least 1.8P from the maximum grip plane when assembled on a minimum grip assembly. A counterbore extends just to the maximum grip plane; that is, the counterbore has a depth of 0.062 (+0.005−0.000) inch (1.57 mm). The run-in extends into the thread at least 1.8P (+0.005−0.000 inch).

In this embodiment of a 10–32 fastener, a maximum material condition nut can be tightened into a maximum material condition bolt a little more than 0.032 inch further than a standard nut, without interference with the root of the bolt thread. Thus, the nut and bolt can each be shortened 0.032 inch or about 1P without decreasing tensile strength or off-axis tensile fatigue.

A bolt provided in practice of this invention has roll formed threads, as distinguished from bolts with machined threads. The thread on a nut employed in practice of this invention may be tapped, or may be made by roll tapping.

The locus of the maximum grip plane is defined herein and in typical aerospace specifications by the thickness of the maximum dimension parts the bolt is designed to connect. At least one user specification for aerospace bolts considers the "maximum grip" to be the end of the cylindrical portion of the shank. If such a definition were adhered to, the length of the run-out where a convex lead-in is used, would appear longer than 1.58P to 1.8P by the permissible length of the lead-in (typically 0.5P). However, such a specification also shortens the distance between the bolt head and the "maximum grip" by (typically) 0.5P. The point is, by either definition the complete thread starts at the same distance from the bolt head.

The preferred embodiment of bolt has a convex lead-in at the end of the cylindrical shank. It will be recognized that this is not essential to practice of this invention and the shank may extend as a cylinder to the maximum grip plane, or a diagonal chamfer may be formed. Likewise, the shank may have a larger diameter than described and the run-out may not blend smoothly into the shank as illustrated, but instead the bolt may have a step-like increase in diameter at the larger diameter end of the run-out.

The run-out zone on the bolt and the run-in zone in the nut have been described as following circular arcs with selected radii. It will be apparent that some non-circular concave or convex curves, respectively, may be equivalent in providing the same result.

Since variations of this sort are within the skill of this art, it will be understood that within the scope of the appended claims, this invention may be practiced otherwise than as specifically described.

What is claimed is:

1. A threaded fastener comprising:
   a head;
   a cylindrical shank;
   a tip having a roll formed thread with a uniform pitch P, a major diameter which is less than the shank diameter, and a minor diameter;
   a maximum grip plane defined between the shank and tip a specified length from the head; and
   a run-out zone between the maximum grip plane and the tip having a length in the range of from 1.58P to 2.3P, the run-out zone having a roll formed thread, the thread root in the run-out zone being tangent to the minor diameter at one end and enlarging toward the maximum grip plane along a continuous outwardly concave curve to at least a portion near the maximum grip plane.

2. A threaded fastener as recited in claim 1 wherein the thread root further enlarges toward the shank diameter along an outwardly convex curve adjacent to the maximum grip plane.

3. A threaded fastener as recited in claim 2 including a smooth transition between the outwardly concave curve and the outwardly convex curve.

4. A threaded fastener as recited in claim 1 wherein the length of the run-out is less than 1.8P.

5. A threaded fastener as recited in claim 4 wherein the thread root follows a concave curve having a radius in the range of from 2.0P to 2.7P.

6. A threaded fastener as recited in claim 5 wherein the continuous curve extends to at least the major diameter.

7. A threaded fastener as recited in claim 5 comprising a convex lead-in between the shank diameter and the concave curve at approximately the major diameter.

8. A threaded fastener as recited in claim 4 comprising a convex lead-in between the shank diameter and the concave curve at approximately the major diameter.

9. A threaded fastener as recited in claim 1 wherein the continuous curve extends to at least the major diameter.

10. A threaded fastener comprising:
    a head;
    a cylindrical shank;
    a tip having a roll formed thread with a uniform pitch P, a major diameter which is less than the shank diameter, and a major diameter;
    a maximum grip plane defined between the shank and tip a specified length from the head; and
    a run-out zone between the maximum grip plane and the tip having a roll formed thread, the thread root being tangent to the major diameter at one end and enlarging toward the maximum grip plane along an outwardly concave curve having a radius in the range of from 2.0P to 2.7P.

11. A threaded fastener as recited in claim 10 comprising a convex lead-in between the shank diameter and the concave curve at approximately the major diameter.

12. A threaded fastener as recited in claim 11 wherein the continuous curve extends to at least the major diameter.

13. A threaded fastener as recited in claim 10 wherein the continuous curve extends to at least the major diameter.

14. A threaded fastener comprising:
a body
a threaded hole in the body;
a thread having a uniform pitch P in the hole;
a counterbore at one end of the hole having an inside diameter larger than the diameter of the thread root and a length less than 1/16 inch plus 0.5P; and
an inwardly convex curved run-in extending into the thread from the counterbore and truncating the crest of the thread, the run-in having a relatively larger diameter at the end of the counterbore, and a relatively smaller diameter at a distance of at least 1.8P from the end of the counterbore substantially tangent to the crests of the thread of the fastener.

15. A threaded fastener as recited in claim 14 wherein the length of the counterbore is approximately 1/16 inch.

16. A threaded fastener as recited in claim 14 wherein the convex curve of the run-in has a radius in the range of from 1.7P to 2.7P.

17. A threaded fastener as recited in claim 16 wherein the length of the counterbore is approximately 1/16 inch.

18. A threaded fastener comprising:
a body;
a threaded hole in the body;
a thread having a uniform pitch P in the hole:
a counterbore at one end of the hole having an inside diameter larger than the diameter of the thread root and a length less than 1/16 inch plus 0.5P; and
a run-in extending into the thread from the counterbore and truncating the crest of the thread, the run-in having a relatively larger diameter at the end of the counterbore, and a relatively smaller diameter substantially tangent to the crests of the thread of the fastener, the run-in truncation following an inwardly convex curve having a radius in the range of from 1.7P to 2.7P.

19. A threaded fastener as recited in claim 18 wherein the length of the counterbore in approximately 1/16 inch.

20. A threaded fastener comprising:
a bolt having a head, a cylindrical shank adjacent to the head, a tip having a roll formed thread with a uniform pitch P, a maximum grip plane defined between the shank and tip a specified length from the head, and a run-out zone between the maximum grip plane and the tip, the run-out zone having a roll formed thread with the thread root being tangent to the minor diameter of the thread on the tip and enlarging toward the maximum grip plane along an outwardly concave curve; and
a nut having a hole with a thread of uniform pitch P, a counter bore in the end of the nut nearer the head of the bolt with an inside diameter larger than the diameter of the shank, and a run-in truncating the crest of the thread along an inwardly convex curve, the length of the run-in from the maximum grip plane when the nut is threaded on the bolt to a minimum grip position being at least as long as the length of the run-out zone from the maximum grip plane, so that the run-in the nut overlaps at least a portion of the run-out on the bolt and the truncated portion of the nut thread clears the bolt thread root in the run-out.

21. A threaded fastener as recited in claim 20 wherein the run-out zone on the bolt extends a distance in the range of from 1.8P to 2.3P from the maximum grip plane.

22. A threaded fastener as recited in claim 20 wherein the run-out zone on the bolt extends a distance in the range of from 1.58P to 1.8P from the maximum grip plane.

23. A threaded fastener as recited in claim 22 wherein the run-in the nut extends a distance of at least 1.8P from the maximum grip plane when the nut is threaded on the bolt to a minimum grip position.

24. A threaded fastener as recited in claim 23 wherein the concave curve on the bolt has a radius in the range of from 2.0P to 2.7P and the convex curve in the nut has a radius not more than the radius of the concave curve.

25. A threaded fastener as recited in claim 24 wherein the length of the counterbore is less than 1/16 inch plus 0.5P.

26. A threaded fastener as recited in claim 24 wherein the length of the counterbore is approximately 1/16 inch.

27. A threaded fastener as recited in claim 24 comprising a convex lead-in on the bolt between the cylindrical shank and the run-out zone adjacent to the maximum grip plane.

28. A threaded fastener as recited in claim 20 wherein the run-in the nut extends a distance in the range of at least 1.8P from the maximum grip plane when the nut is threaded on the bolt to a minimum grip position.

29. A threaded fastener as recited in claim 20 wherein the concave curve on the bolt has a radius in the range of from 2.0P to 2.7P and the convex curve in the nut has a radius not more than the radius of the concave curve.

30. A threaded fastener as recited in claim 20 wherein the run-in the nut extends a distance in the range of at least 2.3P from the maximum grip plane when the nut is threaded on the bolt to a minimum grip position.

31. A threaded fastener as recited in claim 22 wherein the concave curve on the bolt has a radius in the range of from 2.0P to 2.7P and the convex curve in the nut has a radius not more than the radius of the concave curve.

32. A threaded fastener as recited in claim 20 wherein the length of the counterbore is approximately 1/16 inch.

33. A threaded fastener comprising:
a bolt having a cylindrical shank, a tip having a roll formed thread with a uniform pitch P and a thread run-out zone between the thread on the tip and the shank, the run-out having a roll formed thread wherein the root of the thread follows a gradually enlarging path from tangency with the root of the thread on the tip toward the shank, the incomplete thread in the run-out being at least partly completely formed at diameters greater than the thread root in the run-out; and
a nut having a hole with a thread of uniform pitch P and a run-in truncating the crest of the nut thread toward the end of the nut, the incomplete nut thread in the run-in engaging a - completely formed portion of the thread in the run-out on the bolt and the truncation of the nut thread clearing the incomplete thread root in the run-out when the nut is threaded onto the bolt with the run-in overlapping the run-out.

34. A threaded fastener as recited in claim 33 wherein the run-out has a length in the range of from 1.58P to 2.3P.

35. A threaded fastener as recited in claim 34 wherein the run-in has a length of at least 2.3P.

36. A threaded fastener as recited in claim 33 wherein the run-out has a length in the range of from 1.58P to 1.8P.

37. A threaded fastener as recited in claim 36 wherein the run-in has a length of at least 1.8P.

38. A threaded fastener as recited in claim 33 wherein the root of the thread in the run-out follows a concave path having a radius of curvature in the range of from 2.0P to 2.7P.

39. A threaded fastener as recited in claim 38 wherein the nut thread in the run-in is truncated along a convexly curved path having a radius of curvature in the range of from 1.7P to 2.7P.

40. A threaded fastener as recited in claim 33 wherein the nut comprises a counterbore having a depth no more than 1/16 inch plus 0.5P.

41. A threaded fastener as recited in claim 40 wherein the depth of the counterbore is about 1/16 inch.

42. A method for making a threaded fastener having a head, a cylindrical shank adjacent to the head and having a specified length to a maximum grip plane, and a threaded tip beyond the maximum grip plane comprising:

forming a fastener blank with a head, a cylindrical shank, a cylindrical tip having a diameter substantially the same as the pitch diameter of the thread, and a run-out zone between the tip and the shank, the run-out zone having a continuous concave curve from a location tangent to the tip diameter to at least the major diameter of the thread; and rolling the blank between ridged thread forming dies, each of the dies having a run-out chamfer along an edge, the run-out chamfer having a continuous convex curve from the edge to the crests of the thread forming ridges at the same distance from the edge as the distance between the maximum grip plane of the bolt and the location where the run-out zone is tangent to the tip diameter.

43. A method as recited in claim 42 wherein the convex curves on the edge of the thread rolling dies have a radius of curvature in the range of from 2.0P to 2.7P.

44. A method as recited in claim 43 wherein the concave curve on the blank extends a distance from the maximum grip plane in the range of from 1.58P to 1.8P.

45. A method as recited in claim 44 wherein the convex curves on the dies each extend a distance from the edge in the range of from 1.58P to 1.8P.

46. A method as recited in claim 44 comprising forming a lead-in following a convex curve on the blank between the shank and the run-out zone adjacent to the maximum grip plane, the lead-in intersecting the concave curve of the run-out zone at the major diameter of the thread.

47. A method as recited in claim 42 wherein the concave curve on the blank extends a distance from the maximum grip plane in the range of from 1.58P to 1.8P.

48. A method as recited in claim 42 wherein the convex curves on the dies each extend a distance, from the edge in the range of from 1.58P to 1.8P.

49. A method as recited in claim 42 comprising forming a lead-in following a convex curve on the blank between the shank and the run-out zone adjacent to the maximum grip plane, the lead in intersecting the concave curve of the run-out zone at the major diameter of the thread.

50. A method as recited in claim 42 wherein the concave curve on the blank extends a distanced from the maximum grip plane in the range of from 1.58P to 2.3P.

51. A method as recited in claim 42 wherein the convex curves on the dies each extend a distance from the edge in the range of from 1.58P to 2.3P.

* * * * *

UNITED STATES PATENT AND TRADEMARK OFFICE
CERTIFICATE OF CORRECTION

PATENT NO. : 4,915,559
DATED : April 10, 1990
INVENTOR(S) : Roland A. Weeler; Jack Rath It is certified that error appears in the above-identified patent and that said Letters Patent is hereby corrected as shown below:

```
Column 12, line 60, change "major" to -- minor --.
Column 12, line 65, change "major" to -- minor --.

Column 13, line 50, change "in" to -- is --.

Column 14, line 4,  after "run-in" insert -- in --.
Column 14, line 17, after "run-in" insert -- in --.
Column 14, line 35, after "run-in" insert -- in --.
Column 14, line 43, after "run-in" insert -- in --.
Column 14, line 67, delete the dash.

Column 16, line 36, change "distanced" to -- distance --.
```

Signed and Sealed this

Twenty-third Day of July, 1991

*Attest:*

HARRY F. MANBECK, JR.

*Attesting Officer*      *Commissioner of Patents and Trademarks*